(12) United States Patent
Redfern

(10) Patent No.: US 7,418,030 B2
(45) Date of Patent: Aug. 26, 2008

(54) FLEXIBLE INITIALIZATION METHOD FOR DSL COMMUNICATION SYSTEMS

(75) Inventor: Arthur J. Redfern, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 613 days.

(21) Appl. No.: 11/055,377

(22) Filed: Feb. 10, 2005

(65) Prior Publication Data

US 2005/0175078 A1 Aug. 11, 2005

Related U.S. Application Data

(60) Provisional application No. 60/544,005, filed on Feb. 11, 2004, provisional application No. 60/563,844, filed on Apr. 19, 2004.

(51) Int. Cl.
*H04B 1/38* (2006.01)
(52) U.S. Cl. .................. 375/222; 375/219; 379/93.01; 370/453; 455/73
(58) Field of Classification Search ................ 375/259, 375/219, 222; 455/73; 379/93.01; 370/449, 370/453
See application file for complete search history.

(56) References Cited

U.S. PATENT DOCUMENTS 7,260,117 B2 * 8/2007 Long et al. ................. 370/503
2002/0122437 A1 9/2002 Cioffi et al.
2003/0118089 A1 * 6/2003 Deczky ...................... 375/222
2004/0022305 A1 * 2/2004 Tzannes ..................... 375/219
2004/0141550 A1 * 7/2004 Duvaut et al. .............. 375/220
2005/0123028 A1 * 6/2005 Cioffi et al. ................. 375/222
2005/0238091 A1 * 10/2005 Tzannes ..................... 375/222
2006/0050776 A1 * 3/2006 Moon et al. ................. 375/222

FOREIGN PATENT DOCUMENTS

GB 2283879 A 5/1995
WO 9943123 A1 8/1999
WO 03065636 A1 8/2003

* cited by examiner

*Primary Examiner*—Temesghen Ghebretinsae
(74) *Attorney, Agent, or Firm*—Steven A. Shaw; W. James Brady; Frederick J. Telecky, Jr.

(57) ABSTRACT

A communication system 10 initialized using an iterative training portion is disclosed. The communication system 10 comprises a first transceiver 12 operable to communicate according to a digital subscriber line standard and a second transceiver 14 operable to communicate according to the digital subscriber line standard with the first transceiver 12. The first and the second transceivers 12, 14 are operable to perform an initialization 50, including a handshake portion 52, a channel analysis portion 56, and a training portion 54, the first and second transceivers 12, 14 negotiating a plurality of iterations of the training portion 54.

16 Claims, 8 Drawing Sheets

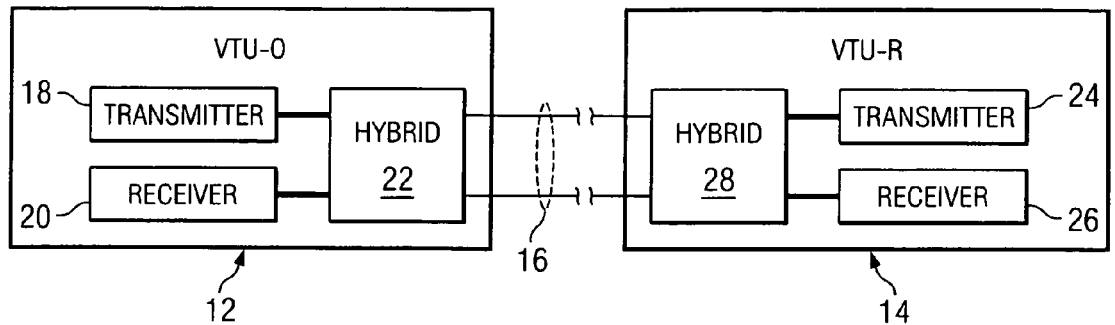

FIG. 1

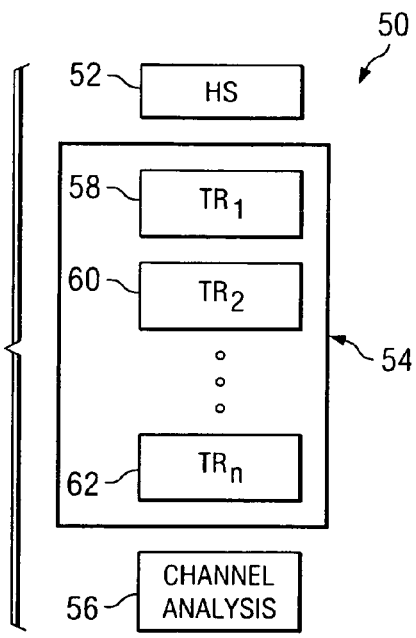

| MESSAGE FIELD | CONTENT | COMMENTS |
|---|---|---|
| 350 → FAIR ALIGNMENT FLAG | 0 or 1 | 0 INDICATES THAT THE VTU-R DOES NOT REQUIRE FRAME ALIGNMENT, 1 INDICATES THAT THE VTU-R REQUIRES FRAME ALIGNMENT |
| 352 → DR | $-(2*2^{8+n}+m*2^{n+1})/2, ..., (2*2^{8+n}+m*2^{n+1})/2$ | NUMBER OF SAMPLES THAT THE START OF THE R-P-TRAININGn SIGNAL IS AHEAD OF THE O-P-TRAININGn SIGNAL AT THE VTU-R |
| 354 → UPSTREAM PSD | PSD DESCRIPTOR OR TSSI VALUES | UPSTREAM PSD FOR R-P-TRAININGn |

FIG. 3

| | PARAMETER | VALUE | COMMENTS |
|---|---|---|---|
| 102 → | Nsc (INITIAL) | n = 0, 1, 2, 3 or 4 | NUMBER OF SUBCHANNELS $N_{sc} = 2^{8+n}$ |
| 104 → | Nsc (SUPPORTED) | $b_1 b_2 b_3 b_4 b_5$, $b_n = 0$ or 1 | SUPPORT OF DIFFERENT NUMBERS OF SUBCHANNELS $N_{sc} = 2^{8+n}$. ONE BIT PER POSSIBLE VALUE OF n IS USED TO INDICATE SUPPORT |
| 106 → | Lce (INITIAL) | m = 0,...,40 | INITIAL CYCLIC EXTENSION LENGTH. $L_{ce} = m*2^{n}+1$ |
| 108 → | Lce (SUPPORTED) | $b_1$, $b_1 = 0$ or 1 | SUPPORT OF ALL CYCLIC EXTENSION VALUES OTHER THAN m = 20 |
| 110 → | Δf (INITIAL) | q = −3, −2, −1, 0 or 1 | INITIAL SUBCHANNEL SPACING $\Delta f = 2^q * 4312.5$ Hz |
| 112 → | Δf (SUPPORTED) | $b_1 b_2 b_3 b_4 b_5$, $b_n = 0$ or 1 | SUPPORT OF SUBCHANNEL SPACINGS $\Delta f = 2^q * 4312.5$ Hz. ONE BIT PER POSSIBLE VALUE OF q IS USED TO INDICATE SUPPORT |
| 114 → | Lprobe$_0$ | 0,...,8000 | LENGTH OF probe$_0$ |
| 116 → | V | $b_1$, $b_1 = 0$ or 1 | VECTORED TRAINING SUPPORT |
| 118 → | PRBS | $b_1 b_2 b_3 b_4 b_5 b_6 b_7 b_8 b_9 b_{10} b_{11}$ | PRBS INITIAL STATE USED FOR TRAINING |

*FIG. 5a*

| MESSAGE FIELD | CONTENT | COMMENTS |
|---|---|---|
| MAX DOWNSTREAM RATE | 0, ..., 255 | MAX DOWNSTREAM RATE IN Mbps. 255 INDICATES THAT VTU-R SHOULD MAXIMIZE THE DOWNSTREAM RATE |
| MAX DOWNSTREAM MARGIN | 0, ..., 31 | MAX DOWNSTREAM MARGIN IN dB. 31 INDICATES THAT THE VTU-R SHOULD MAXIMIZE THE DOWNSTREAM MARGIN |
| PBO MASK SELECTOR | 1 BYTE | DETERMINES WHETHER THE TRANSMIT OR RECEIVE PSD IS USED FOR PBO |
| UPSTREAM BANDS | BAND DESCRIPTOR | UPSTREAM BANDS |
| MAX UPSTREAM PSD | PSD DESCRIPTOR OR TSSI VALUES | MAX UPSTREAM PSD |
| REFERENCE UPSTREAM PSD | PSD DESCRIPTOR OR TSSI VALUES | REFERENCE PSD FOR UPSTREAM PBO |
| DOWNSTREAM BANDS | BAND DESCRIPTOR | DOWNSTREAM BANDS |
| MAX DOWNSTREAM PSD | PSD DESCRIPTOR OR TSSI VALUES | MAX DOWNSTREAM PSD |
| DOWNSTREAM PSD | PSD DESCRIPTOR OR TSSI VALUES | DOWNSTREAM PSD FOR O-P-TRAINING0 |
| FAIR ALIGNMENT FLAG | 0 or 1 | 0 INDICATES THAT THE VTU-O DOES NOT REQUIRE FRAME ALIGNMENT, 1 INDICATES THAT THE VTU-O REQUIRES FRAME ALIGNMENT |
| U | 0, ..., 64 | NUMBER OF VECTORED SYSTEMS. IF VECTORED TRAINING IS NOT USED, U=1 |
| u | 0, ..., 63 | INDEX ASSIGNED TO THE VECTORED SYSTEM. IF VECTORED TRAINING IS NOT USED, u=0 |
| $PRBS_0, ..., PRBS_{U-1}$ | 11*U BITS | INITIAL STATES FOR THE PRBS's USED BY EACH OF THE U VECTORED SYSTEMS. $PRBS_u$ SHOULD MATCH THE PRBS EXCHANGED DURING G.hs |

FIG. 5b

| MESSAGE FIELD | CONTENT | COMMENTS |
|---|---|---|
| ITERATION FLAG | 0 or 1 | INDICATES THAT A TRAINING ITERATION IS REQUIRED |
| END ITERATION FLAG | 0, 1, or 2 | INDICATES THAT: 0: MORE ITERATIONS ARE ALLOWED 1: THE CURRENT ITERATION IS THE LAST ALLOWED ITERATION 2: THE NEXT ITERATION IS THE LAST ALLOWED ITERATION |
| $L_{O-P-MEDLEYn}$ | 0, ..., 4000 | MINIMUM LENGTH OF THE MEDLEY TRAINING STATE FOR THE CURRENT TRAINING ITERATION |
| $L_{O-P-ECn}$ | 0, ..., 4000 | LENGTH OF THE VTU-O EC TRAINING STATE FOR THE CURRENT TRAINING ITERATION |
| $L_{O-P-PROBEn+1}$ | 0, ..., 4000 | LENGTH OF THE VTU-O PROBEn STATE AT THE START OF THE NEXT TRAINING ITERATION |
| UPSTREAM PSD UPDATE | UPDATE DESCRIPTOR | REQUESTED UPSTREAM PSD UPDATE FOR R-P-TRAININGn+1 |
| TIMING ADVANCE CORRECTION | 2 BYTES | REQUESTED TIMING ADVANCE CORRECTION FOR R-T-P-TRAININGn+1 |
| O-Nsc | n=0, 1, 2, 3, or 4 | REQUESTED NUMBER OF SUBCHANNELS $NSC=2^{8+n}$ FOR THE NEXT TRAINING ITERATION |
| O-Lce | m=0, ..., 40 | REQUESTED CYCLIC EXTENSION LENGTH $Lce=m*2^{n+1}$ FOR THE NEXT TRAINING ITERATION |
| O-$\Delta$f | q=-3, -2, -1, 0, or 1 | REQUESTED SUBCHANNEL SPACING $\Delta f=2^q*4312.5$ Hz FOR THE NEXT TRAINING ITERATION |
| DOWNSTREAM PSD | PSD DESCRIPTOR OR TSSI VALUES | DOWNSTREAM PSD FOR O-P-TRAININGn |
| O-Lcp | 0, ..., 1280($m*2^{n+1}$, m=40, n=4) | CURRENT DOWNSTREAM CYCLIC PREFIX LENGTH |
| O-Lcs | 0, ..., 1280($m*2^{n+1}$, m=40, n=4) | CURRENT DOWNSTREAM CYCLIC SUFFIX LENGTH |
| O-B | 0, ..., 256, ($16*2^n$, n=4) | CURRENT DOWNSTREAM TRANSMIT WINDOW LENGTH |
| REGION SPECIFIC | REGION SPECIFIC DESCRIPTOR | REGION SPECIFIC INFORMATION |
| FUTURE USE | FUTURE DESCRIPTOR | FUTURE INFORMATION |
| $L_{O-P-VECn}$ | 0, ..., 4000 | LENGTH OF THE FULL BAND VTU-O TRANSMIT STATE DURING VECTOR TRAINING |
| $L_{R-P-VECn}$ | 0, ..., 4000 | LENGTH OF THE FULL BAND VTU-R TRANSMIT STATE DURING VECTOR TRAINING |

FIG. 5d

| MESSAGE FIELD | CONTENT | COMMENTS |
|---|---|---|
| ITERATION FLAG | 0 or 1 | INDICATES THAT A TRAINING ITERATION IS REQUIRED |
| PILOT SUBCHANNEL | $1, \ldots, 4095(2^{n+8}-1, n=4)$ | PILOT SUBCHANNEL DURING EC TRAINING STATES |
| $L_{R-P-MEDLEYn}$ | $L_{O-P-MEDLEYn}, \ldots, 4000$ | LENGTH OF THE MEDLEY TRAINING STATE FOR THE CURRENT TRAINING ITERATION ITS MINIMUM VALUE IS $L_{O-P-MEDLEYn}$ |
| $L_{R-P-ECn}$ | $0, \ldots, 4000$ | LENGTH OF THE VTU-R EC TRAINING STATE FOR THE CURRENT TRAINING ITERATION |
| $L_{R-P-PROBEn+1}$ | $0, \ldots, 4000$ | LENGTH OF THE VTU-R PROBEn STATE AT THE START OF THE NEXT TRAINING ITERATION |
| DOWNSTREAM PSD UPDATE | UPDATE DESCRIPTOR | REQUESTED DOWNSTREAM PSD UPDATE FOR O-P-TRAININGn+1 |
| R-Nsc | n=0, 1, 2, 3, or 4 | REQUESTED NUMBER OF SUBCHANNELS $Nsc=2^{8+n}$ FOR THE NEXT TRAINING ITERATION |
| R-Lce | m=0, ..., 40 | REQUESTED CYCLIC EXTENSION LENGTH $Lce=m*2^{n+1}$ FOR THE NEXT TRAINING ITERATION |
| R-Δf | q=-3, -2, -1, 0, or 1 | REQUESTED SUBCHANNEL SPACING $\Delta f=2^q*4312.5$ Hz FOR THE NEXT TRAINING ITERATION |
| UPSTREAM PSD | PSD DESCRIPTOR OR TSSI VALUES | UPSTREAM PSD FOR R-P-TRAININGn+1 |
| R-Lcp | $0, \ldots, 1280(m*2^{n+1}, m=40, n=4)$ | CURRENT UPSTREAM CYCLIC PREFIX LENGTH |
| R-Lcs | $0, \ldots, 1280(m*2^{n+1}, m=40, n=4)$ | CURRENT UPSTREAM CYCLIC SUFFIX LENGTH |
| R-B | $0, \ldots, 256, (16*2^n, n=4)$ | CURRENT UPSTREAM TRANSMIT WINDOW LENGTH |
| REGION SPECIFIC | REGION SPECIFIC DESCRIPTOR | REGION SPECIFIC INFORMATION |
| FUTURE USE | FUTURE DESCRIPTOR | FUTURE INFORMATION |

US 7,418,030 B2

FLEXIBLE INITIALIZATION METHOD FOR DSL COMMUNICATION SYSTEMS

CROSS-REFERENCE TO RELATED APPLICATIONS

This application claims priority to U.S. Provisional Application No. 60/544,005 filed Feb. 11, 2004, and entitled "A Flexible Initialization Method for DSL Communication Systems," by Arthur Redfern, and to U.S. Provisional Application No. 60/563,844 filed Apr. 19, 2004, and entitled "Flexible Initialization Method for DSL Communication Systems," by Arthur Redfern, both of which are incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to communication systems, and more particularly, but not by way of limitation, to a flexible initialization method for digital subscriber line (DSL) communication systems.

BACKGROUND OF THE INVENTION

Data communication devices may use various data transmission rates, data encoding formats, and modulation techniques. Two transceivers may cooperate to determine the quality of the communication channel they use to communicate with each other. The two transceivers may also share information to make a collective decision to select operational parameters controlling their communication, for example data transmission rates and data encoding techniques.

In general, data communication takes place in accordance with communication standards which promote interoperability of equipment produced by different manufacturers. As the electronics art advances, the ability to increase data throughput leads to new communication standards supporting higher data transmission rates.

SUMMARY OF THE INVENTION

A communication system initialized using an iterative training portion is disclosed. The communication system comprises a first transceiver operable to communicate according to a digital subscriber line standard and a second transceiver operable to communicate according to the digital subscriber line standard with the first transceiver, the first and the second transceivers operable to perform an initialization, including a handshake portion, a channel analysis portion, and a training portion, the first and second transceivers negotiating a plurality of iterations of the training portion.

A digital subscriber line transceiver using iterative training during initialization is also disclosed. The digital subscriber line transceiver comprises a transmitter section operable to perform an initialization with a remote transceiver, the initialization including a first handshake portion, a first channel analysis portion, and a first training portion, a plurality of iterations of the training portion between the transmitter and remote transceiver used to perform the initialization and a receiver section operable to initialize with the remote transceiver using a second handshake portion, a second channel analysis portion, and a second training portion, a plurality of second training iterations used to perform the initialization between the receiver section and the remote transceiver.

A method for initializing digital subscriber line communication between transceivers is also disclosed. The method comprises transmitting from a first transceiver a first handshake message, the first handshake message including an initial value for a pseudo-random binary sequence, receiving a second handshake message, iteratively communicating a training portion between the first transceiver and a second transceiver, and transmitting a first channel analysis message from the first transceiver to the second transceiver.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 1 is an illustration of a first and second transceiver in communication over a channel according to an embodiment of the present disclosure.

FIG. 2 is an illustration of an initialization session according to an embodiment of the present disclosure.

FIG. 3 is an illustration of a handshake portion of the initialization session according to an embodiment of the present disclosure.

FIG. 5a is an illustration of an O-Info message of a first message sequence of the training portion of the initialization session according to an embodiment of the present disclosure.

FIG. 5b is an illustration of an O-Modpsd$_n$ message of the first message sequence of the training portion of the initialization session according to an embodiment of the present disclosure.

FIG. 5c is an illustration of a R-Info$_a$ message of a second message sequence of the training portion of the initialization session according to an embodiment of the present disclosure.

FIG. 5d is an illustration of a R-Modpsd$_n$ message of the second message sequence of the training portion of the initialization session according to an embodiment of the present disclosure.

DETAILED DESCRIPTION OF THE PREFERRED EMBODIMENTS

Figure 4A:
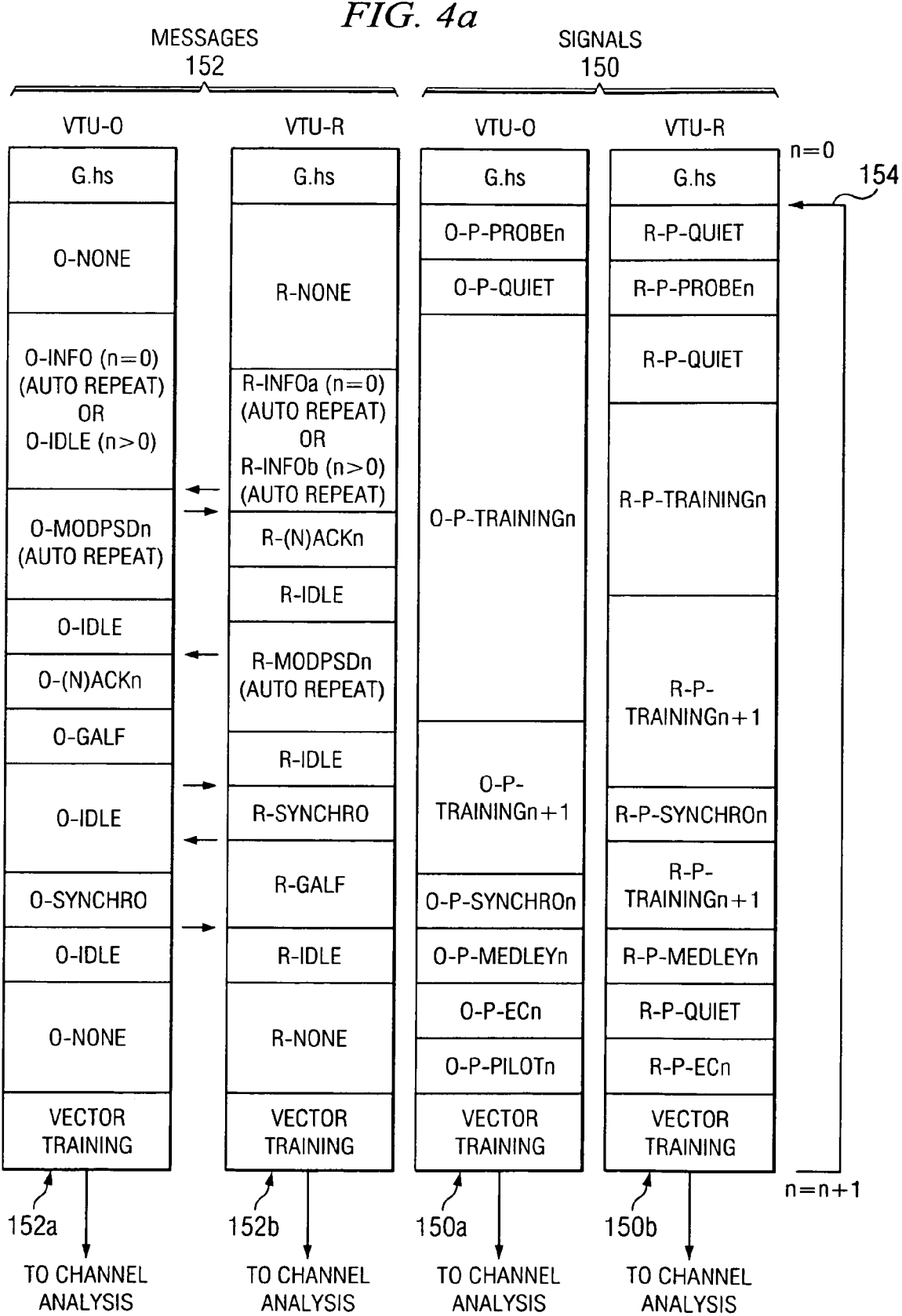
FIG. 4a is an illustration of a training portion of the initialization session according to an embodiment of the present disclosure.

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

At least some of the communication parameters that are determined during initialization of a communication system may be interrelated. A system and method are disclosed hereinafter which employs multiple training iterations to optimize communication parameters by converging on final parameter values. Thus, generally, a first training session occurs using initial parameter values, parameter values are adjusted based on the results of the first training session, a second training session occurs using the adjusted parameter values, parameter values are adjusted again, and so on, until the parameters converge on an optimized communication configuration. Other initialization refinements are also disclosed.

Turning now to FIG. 1, a block diagram depicts a digital subscriber line (DSL) communication system 10. The DSL communication system 10 comprises a first DSL transceiver 12 communicating with a second DSL transceiver 14 over a channel 16. In an embodiment, the channel 16 may comprise an unshielded twisted pair of copper wires. In another embodiment, the channel 16 may be different. The first DSL transceiver 12 may be located in a central office (CO) operated by a telephone company and may be referred to as a VTU-O (video terminal unit in the central office). The second DSL transceiver 14 may be located in the home of a DSL subscriber and may be referred to as a VTU-R (video terminal unit in the residence). In another embodiment, the first and second DSL transceivers 12, 14 may be located elsewhere. The second DSL transceiver 14 may be referred to as customer premises equipment (CPE). The first DSL transceiver 12 and the second DSL transceiver 14 communicate in accordance with one or more DSL communication standards including DSL, asynchronous digital subscriber line (ADSL), very-high-data-rate digital subscriber line (VDSL), or other communication standards.

The first DSL transceiver 12 includes a first transmitter 18, a first receiver 20, and a first hybrid 22. The second DSL transceiver 14 includes a second transmitter 24, a second receiver 26, and a second hybrid 28. The first and second transmitters 18, 24 format data according to the appropriate DSL standard and send the formatted data to the first and second hybrid 22, 28 for transmission on the channel 16. The first and second receivers 20, 26 receive formatted data from the first and second hybrid 22, 28 and decode the data for consumption by other processes (not shown), for example by a higher layer application. The hybrid, for example the first hybrid 22 or the second hybrid 28, is a device well known to those skilled in the art that has the general function of enabling four wire communications, two wires for transmitting and two wires for receiving, to be carried out over only two wires. The first and second transceivers 12, 14 each may be implemented in a single integrated circuit or in two or more integrated circuits coupled to one another. In an embodiment, the first and second hybrids 22, 28 may not be integrated circuits and may be analog components.

The first and second transceivers 12, 14 may coordinate with each other to determine operational parameters to employ to promote communications. The operational parameters may include a power spectrum density (PSD), an automatic gain control (AGC) setting, an echo cancellation setting to employ in transmitting and/or receiving communications, and other parameters. The first and second transceivers 12, 14 may share information about these operational parameters during an initialization session prior to engaging in substantive communication. The transition from initialization to engaging in substantive communication may be referred to as "go to showtime."

Turning now to FIG. 2, an initialization session 50 is depicted. During the initialization session 50, which may be referred to as initialization, the first transceiver 12 and the second transceiver 14 adjust communication parameters to promote improved communication. After the initialization session 50, the first and second transceivers 12, 14 may remain initialized for a week or considerably longer without a further initialization being necessary. In another embodiment, however, the first and second transceivers 12, 14 may remain initialized for a shorter period of time. In an embodiment, the initialization session 50 may comprise a handshake portion 52, a training portion 54, and a channel analysis portion 56. During the handshake portion 52, a minimal number of parameters are exchanged between the first transceiver 12 and the second transceiver 14. In general, both initial values and supported values of parameters are exchanged during the handshake portion 52, thereby allowing each transceiver, for example the second transceiver 14, to know the bounds of modulation parameter values that can be recommended to the other transceiver, for example the first transceiver 12.

The training portion 54 is directed to optimizing operational parameters and may be referred to as training. Because the operational parameters are interrelated, training is done in an iterative fashion wherein the training portion 54 comprises a first training iteration 58, a second training iteration 60, and a plurality of additional training iterations terminating in an n-th training iteration 62. The first and second transceiver 12, 14 may adjust their operational parameters based on each training iteration, for example based on the first training iteration 58 and the second training iteration 60. The purpose of the training portion 54 is for the first and second transceivers 12, 14 to converge on an optimal or nearly optimal setting of operational parameters over the training iterations 58, 60, 62. The first and second transceiver 12, 14 may cooperatively determine the number of training iterations to conduct during the training portion 54.

The channel analysis portion 56 includes the first and second transceivers 12, 14 exchanging bits, gains, and tone ordering data table information. The channel analysis portion 56 begins with the first and second transceivers 12, 14 exchanging a list of valid subchannels for messaging using byte based messaging. The set of valid subchannels may be determined as a result of the training portion 54. The channel analysis portion 56 continues with the first and second transceivers 12, 14 exchanging additional channel analysis messages transmitted with 2 bits per subchannel on each of the valid subchannels.

Turning now to FIG. 3, a preferred embodiment of the handshake portion 52 is depicted. In an embodiment, the handshake portion 52 includes an initial number of subchannels Nsc(initial) 102 parameter, a supported number of subchannels Nsc(supported) 104 parameter, an initial cyclic extension length Lce(initial) 106 parameter, a supported cyclic extension length Lce(supported) 108 parameter, an initial subchannel spacing $\Delta f$(initial) 110 parameter, a supported subchannel spacing $\Delta f$(supported) 112 parameter, a length of the first probe $Lprobe_0$ 114 parameter for the first training iteration 58, and a vectored training support V 116 parameter. The handshake portion 52 transmitted by the first transceiver 12 and the handshake portion 52 transmitted by the second transceiver 14 both share the parameters described above. One of the two transceivers, for example the first transceiver 14, may have a pseudo-random binary sequence (PRBS) 118 parameter. The $Lprobe_O$ 114 parameter defines the length of a probe signal, to be discussed hereinafter, that may be transmitted during the first training iteration 58.

A vectored communication mode involves communicating from a first point to a second point, splitting a single stream of data into multiple physical streams at the first point, transmitting from the first point via multiple channels 16 in close physical proximity to each other, receiving at the second point, and recombining the multiple physical streams into a single stream of data at the second point. In this communication mode, there may be multiple first transceivers 12 at the first point and multiple second transceivers 14 at the second point. The crosstalk between the multiple channels 16 may be at least partially compensated by the first and second transceivers 12, 14 based on vectored training during the training portion 54. The V 116 parameter indicates whether vectored training is a supported part of the training portion 54. The PRBS 118 parameter identifies a first or seed value of one or more pseudo-random binary sequences which may be transmitted during the training portion 54.

Turning now to FIG. 4a, a preferred embodiment of the first training iteration 58 is depicted. The second training iteration 60, subsequent training iterations, and the n-th training iteration 62 have substantially the same structure as the first training iteration 58. An arrow 154 on the right side of FIG. 4a suggests the iteration of multiple training iterations, employing a counter n with an initial value of 0 to start, wherein the counter n increments after each pass through a training iteration. The counter n may or may not be employed by the first and second transceivers 12, 14. The role of the counter n in FIG. 4 is to suggest graphically the iteration of multiple training iterations.

During the first training iteration 60, the first and second transceiver 12, 14 each transmit a signal sequence on the channel 16. At least part of each of the signal sequences transmitted by the first and second transceivers 12, 14 is known, and hence the received signal sequences, when compared with the expected known portion of the signal sequences, may be used by the first and second transceivers 12, 14 to recommend parameter changes for the second training iteration 62. During the first training iteration 60, the first and second transceiver 12, 14 each transmit a message sequence on the channel 16. The messages are employed by both the first and second transceiver 12, 14 to promote parameter optimization, including indicating the parameters to be used in the next signal sequence. During subsequent training iterations, the above process is substantially repeated: signal sequences are transmitted by the first and second transmitters 12, 14 and changes to modulation parameters may be requested by the first and second transmitters 12, 14 based on the received signal sequences in the message sequences.

The first training iteration 58 comprises a plurality of signal sequences 150 and a plurality of message sequences 152. In an embodiment, the order of signals and messages within the first training iteration 58, and subsequent training iterations, is significant and promotes more effective convergence on preferred communication parameters. For example, it may be desirable to minimize breaks in timing and to confine breaks in timing to early portions of each training iteration. To minimize timing breaks, a downstream pilot or known signal should be available, with minimal or no interruption, after an early point in each training iteration. The downstream pilot may be provided, for example, from the first receiver 12 to enable the second receiver 14 to keep time or alternatively from the second receiver 14 to enable the first receiver 12 to keep time. The transition from the training portion 54 to the channel analysis portion 56 may be eased if there are not any parameter changes requiring synchronization that occur immediately before channel analysis.

The signal sequences 150 include a first signal sequence 150a transmitted by the first transceiver 12 and a second signal sequence 150b transmitted by the second transceiver 14. The message sequences 152 include a first message sequence 152a transmitted by the first transceiver 12 and a second message sequence 152b transmitted by the second transceiver 14.

Figure 4B:
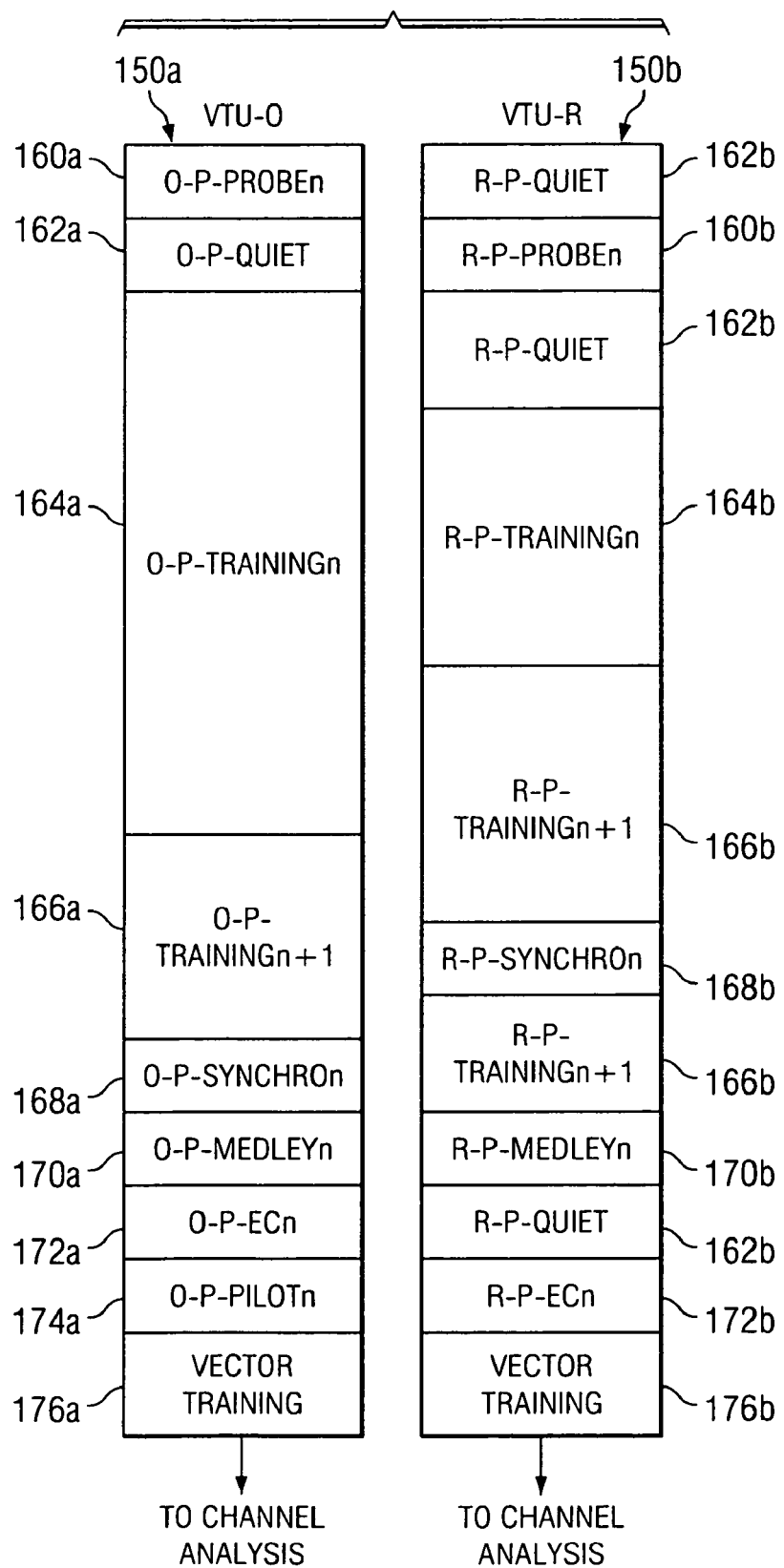
FIG. 4b is an illustration of a plurality of signal sequences of the training portion of the initialization session according to an embodiment of the present disclosure.

Turning now to FIG. 4b, the signal sequences 150 are depicted. The first signal sequence 150a includes an $O-P-Probe_n$ signal 160a, an O-P-Quiet signal 162a, an $O-P-Training_n$ signal 164a, an $O-P-Training_{n+1}$ signal 166a, an $O-P-Synchro_n$ signal 168a, an $O-P-Medley_n$ signal 170a, an $O-P-EchoCancellation_n$ signal 172a, an $O-P-Pilot_n$ signal 174a, and an optional first vector training signal 176a. The second signal sequence 150b includes a $R-P-Probe_n$ signal 160b, a R-P-Quiet signal 162b, a $R-P-Training_n$ signal 164b, a $R-P-Training_{n+1}$ signal 166b, a $R-P-Synchro_n$ signal 168b, a $R-P-Medley_n$ signal 170b, a $R-P-EchoCancellation_n$ signal 172b, and an optional second vector training signal 176b. Note that the signals are illustrated in a preferred order where a first signal depicted above a second signal occurs earlier in time than the second signal.

The $O-P-Probe_n$ signal 160a is defined by the first transceiver 12, is limited by a current downstream PSD parameter associated with the first transceiver 12, and has a length identified in the $Lprobe_O$ parameter 114 of the handshake portion 52 sent by the first transceiver 12. The downstream PSD parameter limits the maximum transmission power and will be discussed hereinafter. The first transceiver 12 transmits the $O-P-Probe_n$ signal 160a into the channel 16, listens for reflections back from the channel 16, and adjusts the first hybrid 22 to minimize the reflections back from the channel 16. To promote the adjustment of the first hybrid 22, the second transceiver 14 maintains silence on the channel 16, indicated by the R-P-Quiet signal 162b, while the first transceiver 12 sends the $O-P-Probe_n$ signal 160a. After the conclusion of the $O-P-Probe_n$ signal 160a, the first transceiver 12 continuously transmits a pilot signal as describer further hereinafter. The pilot signal promotes the second transceiver 14 maintaining a timing lock with the first transceiver 12 during the remainder of the training iteration.

The $R-P-Probe_n$ signal 160b is defined by the second transceiver 14, is limited by a current downstream PSD associated with the second transceiver 14, and has a length identified in the $Lprobe_O$ parameter 114 of the handshake portion 52 sent by the second transceiver 14. During the first training iteration 58 (n=0), if the upstream PSD is to be selected using the reference PSD method, then the PSD limit for the $R-P-Probe_n$ signal 160b is −60 dBm/Hz in the valid upstream subchannels or frequency bands. The second transceiver 14 transmits the $R-P-Probe_n$ signal 160b into the channel 16, listens for reflections back from the channel 16, and adjusts the second hybrid 28 to minimize the reflections back from the channel 16. To promote the adjustment of the second hybrid 28, the first transceiver 12 maintains silence on the channel 16, indicated by the O-P-Quiet signal 162a, while the second transceiver 14 sends the $R-P-Probe_n$ signal 160b. Once the first and second hybrid 22, 28 are adjusted, it may be possible to omit the $O-P-Probe_n$ signal 160a and the $R-P-Probe_n$ signal 160b in later training iterations, for example in the second training iteration 60 through the n-th training iteration 62. To omit the $O-P-Probe_n$ signal 160a in a subsequent training iteration, the first transceiver 12 may send a $L_{O-P-PROBEn+1}$ parameter in an $O-Modpsd_n$ message, to be described hereinafter, having a value of 0. To omit the $R-P-Probe_n$ signal 160b in a subsequent training iteration, the second transceiver 14 may send a $L_{R\text{-}P\text{-}PROBEn+1}$ parameter in an R-Modpsd$_n$ message, to be described hereinafter, having a value of 0.

The O-P-Training$_n$ signal 164a, the R-P-Training$_n$ signal 164b, the O-P-Training$_{n+1}$ signal 166a, the R-P-Training$_{n+1}$ signal 166b, the O-P-Synchro$_n$ signal 168a, the R-P-Synchro$_n$ signal 168b, the O-P-Medley$_n$ signal 170a, and the R-P-Medley$_n$ signal 170b are conventional in VDSL version 1 and known to those skilled in the art. In general, these signal sequences are pseudo-random binary sequences which are started using an initial value or seed value defined in the PRBS 118 parameter of the handshake portion 52. Generally, the training and medley sequences are employed to promote selection of operational parameter values for the next training iteration which are exchanged through the message sequences 152.

The O-P-EchoCancellation$_n$ signal 172a is defined by the first transceiver 12 and includes the pilot ((1,1) point at the downstream PSD level on the subchannel selected by the second transceiver 14), limited by the current downstream PSD parameter associated with the first transceiver 12. The R-P-EchoCancellation$_n$ signal 172b is defined by the second transceiver 12 and includes a pilot ((1,1) point at the downstream PSD level on the subchannel selected by the first transceiver 12), limited by the current downstream PSD parameter associated with the second transceiver 14. The echo cancellation signals are employed by the first and second transceiver 12, 14 to adjust echo cancellation parameters. The first transceiver 12 transmits the O-P-Pilot$_n$ signal 174a as the same constellation point, the (1,1) 4-QAM constellation point, on the pilot subchannel selected by the second transceiver 14. The power at which the pilot is transmitted is based on the downstream PSD. The first transceiver 12 may transmit any signal, limited by the downstream PSD, on the remaining subchannels during the O-P-EchoCancellation$_n$ signal 172a. Note that the first transceiver 12 transmits the pilot on the pilot subchannel continuously after the conclusion of the O-P-Probe$_n$ signal 160a, promoting the second transceiver 14 maintaining a timing lock with the first transceiver 12 during the remainder of the training iteration.

The first vector training signal 176a and the second vector training signal 176b are optional and used when the vectored communication mode is utilized. The first and second vector training signals 176a and 176b are employed to promote selection of parameters to enhance vectored communications.

Figure 4C:
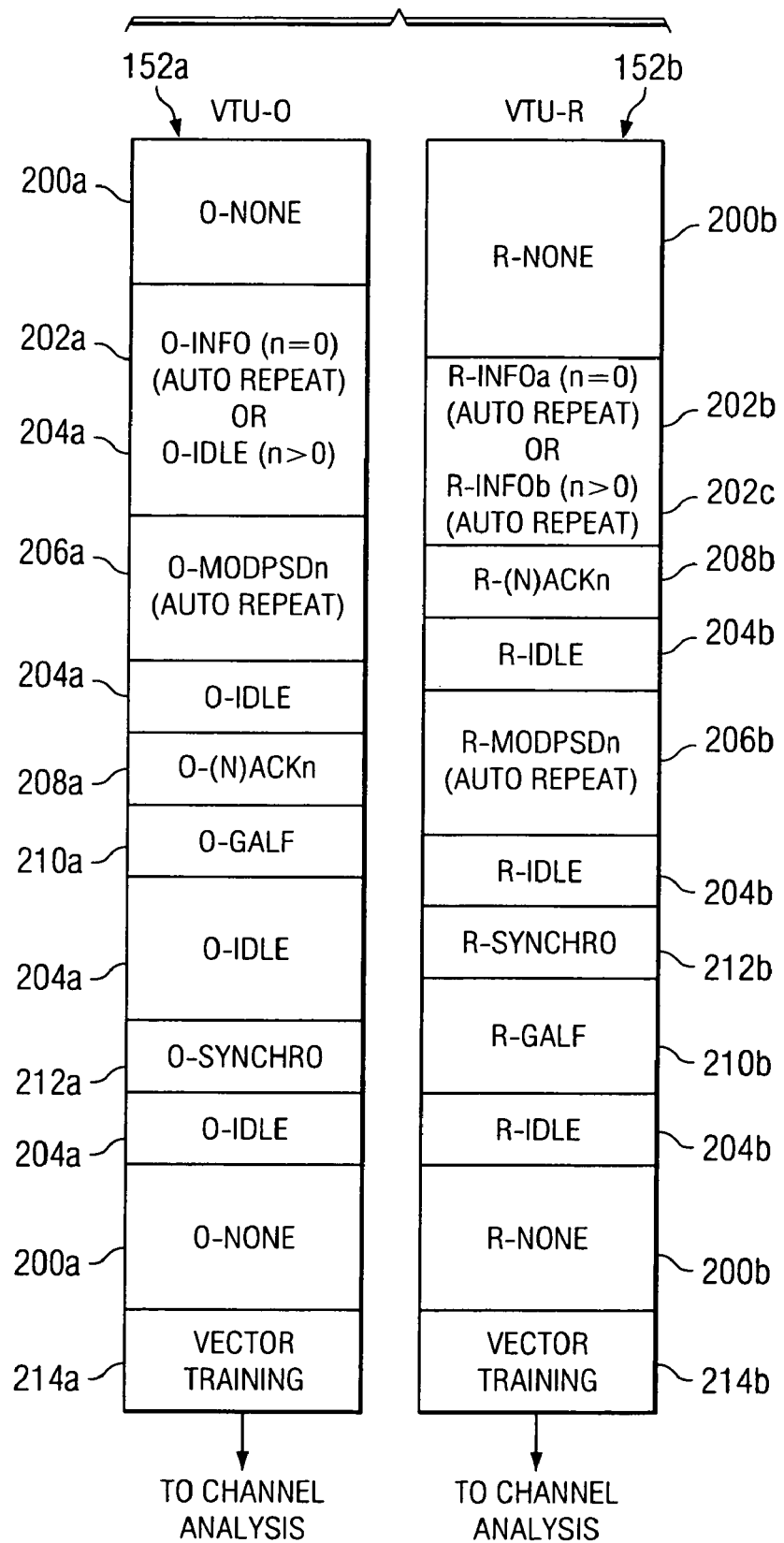
FIG. 4c is an illustration of a plurality of message sequences of the training portion of the initialization session according to an embodiment of the present disclosure.

Turning now to FIG. 4c, the message sequences 152 are depicted. The message sequences 152 are generally transmitted over a special overhead messaging channel (SOC) using the VDSL version 1 SOC message and signaling format, though other messaging methods may be used. Generally, the SOC is implemented by changing the quadrature amplitude modulation (QAM) symbols which encode the signal sequences 150 in some of the subchannels. The first message sequence 152a includes an O-None 200a message, an O-Info 202a message, an O-Idle 204a message, an O-Modpsd$_n$ 206a message, an O-(N)ACK$_n$ 208a message, an O-Galf 210a message, an O-Synchro 212a message, and a Vector Training 214a message. The second message sequence 152b includes a R-None 200b message, a R-Info$_a$ 202b message, a R-Info$_b$ 202c message, a R-Idle 204b message, a R-Modpsd$_n$ 206b message, a R-(N)ACK$_n$ 208b message, a R-Galf 210b message, a R-Synchro 212b message, and a Vector Training 214b message.

The O-None 200a and R-None 200b messages indicate that no messages are transmitted during this interval and the associated SOC is inactive.

Turning now to FIG. 5a, a preferred embodiment of the O-Info 202a message is depicted. The O-Info 202a message is sent during the first training iteration 58 and contains information the second transceiver 14 may use to adjust a transmit PSD parameter and a receive PSD parameter of the second transceiver 14. Because this information is not anticipated to change during subsequent training iterations, the O-Idle 204a message may be substituted for the O-Info 202a message on the second training iteration 60, subsequent training iterations, and on the n-th training iteration 62. A maximum downstream rate message field 250 and a maximum downstream margin message field 252 promote the ability of the second receiver 14 to optimize the downstream PSD during the training portion 54 to achieve a targeted rate and margin limit (e.g., to further reduce the downstream PSD level if an excess rate and margin condition is detected).

A PBO mask selector message field 254 determines the method the second transceiver 14 uses to determine the initial upstream PSD. Typically, large contiguous bands of subchannels are employed for both upstream and downstream communication. An upstream bands message field 256 indicates the subchannels to be used for upstream transmission, where the bands of employed subchannels are identified by identifying the start and stop subchannels of each of the upstream bands. A maximum upstream message field PSD 258 and reference upstream PSD message field 260 is included so that the second transceiver 14 uses the appropriate PSD for the R-P-Training$_0$ signal 164b. A downstream bands message field 262 indicates the subchannels to be used for downstream transmission, where the bands of employed subchannels are identified by identifying the start and stop subchannels of each of the downstream bands. A maximum downstream PSD message field 264 is included so that the second transceiver 14 knows the appropriate PSD bounds when it requests PSD modifications in the R-Modpsd$_n$ 206b message to be described hereinafter. A downstream message field PSD 266 is included that identifies what PSD the first transceiver 12 is going to employ when transmitting to the second transceiver 14. Knowing the downstream PSD promotes the second transceiver 14 parameter optimization based on training. A fair alignment flag message field 268 indicates whether fair frame alignment is selected. In fair alignment, the time offset of frame alignment may be distributed equally or biased in some other distribution between the first transceiver 12 and the second transceiver 14.

A U message field 270 indicates the number of vectored systems employed. A u message field 272 is a vector index for vectored communication mode. A PRBS message field 274 identifies the initial values or seed values for the pseudo-random binary sequences used by each of the U vectored systems. Using different initial values or seed values for the pseudo-random binary sequences enhances the training of the vectored systems, as it may allow for the estimation of crosstalk and associated parameters during the vectored training 176 signals.

Turning now to FIG. 5b, a preferred embodiment of the O-Modpsd$_n$ 206a message is depicted. The O-Modpsd$_n$ 206a message is employed to optimize the upstream PSD, timing advance, and modulation parameters. The O-modpsd$_n$ 206a message also indicates whether additional training iterations are required and the lengths of some signals. If a first iteration flag message field 300 is 0, no further training iterations occur and the following message fields are ignored. An end iteration flag message field 302 indicates that more iterations are allowed when a zero value is present, that the current iteration is the last allowed iteration when a one value is present, and that the next iteration is the last allowed iteration when a two value is present. The first iteration flag message field 300 and the end iteration flag 302 provide a mechanism for the first transceiver 12, or VTU-O, to negotiate the number of training iterations with the second transceiver 14, or VTU-R, and to unilaterally declare an end to training iterations. In an embodiment, the first transceiver 12 may set the end iteration flag 302 to end training iterations after one or more training iterations wherein no operation parameters were changed by either the first or second transceiver 12, 14, thereby suggesting optimized or desirable-operational parameters may have been selected. Again, employing a series of training iterations may promote more optimized or improved selection of communication parameters due to the interactions among the several communication parameters. For example, a deterministic, single training iteration method may determine that three parameters should have each a specific value different from the value used during the training, that the parameter values be changed accordingly, and that communication proceed with those changed parameter values. In the present embodiment, by contrast, a multiple training iteration method may determine that the three parameters should be changed only part of the way between the current value and the estimated optimal value, may change the parameter values, repeat the training, and readjust the parameter values again only part of the way between the current value and the estimated optimal value, thereby converging to optimal or nearly optimal values over multiple training iterations.

A $L_{O-P-MEDLEYn}$ message field 304, a $L_{O-P-ECn}$ message field 306, and a $L_{O-P-PROBEn+1}$ message field 308 indicate the length of the O-P-Medley$_n$ signal 170a, the O-P-EchoCancellation$_n$ signal 172a, and the O-P-Probe$_n$ signal 160a, respectively. Depending on the state of the training session 54, these signals may be reduced in length to streamline the initialization session 50, which may be referred to as a fast initialization or a fast training iteration. For example, after the first training iteration the length of the O-P-Probe$_n$ signal 160a and the R-P-Probe$_n$ signal 160b may be reduced to zero length, the training of the first and second hybrids 22, 28 having been accomplished during the first training iteration.

An upstream PSD update message field 310 describes the requested upstream PSD for the next training iteration from the second transceiver 14. A PSD defines transmission power at each of the frequencies across the subject communication spectrum, and a PSD mask defines the upper limit allowed for the PSD. The upstream PSD defines the transmission power to be used by the second transceiver 14, or VTU-R, to transmit to the first transceiver 12, or VTU-O. The downstream PSD defines the transmission power to be used by the first transceiver 12, or VTU-O, to transmit to the second transceiver 14, or VTU-R.

A timing advance correction message field 312 is used in association with fair frame alignment. If the first transceiver 12, for example VTU-O, would like to achieve fair frame alignment and both the first transceiver and the second transceiver 14, for example VTU-R, require fair frame alignment, then the first transceiver 12 estimates a variable (do), the difference between the start of the first signal sequence 150a and the second signal sequence 150b at the first transceiver 12 and requests a timing advance of ((do)−(dr))/2, where the variable (dr) is defined hereinafter when discussing the R-Info$_a$ 202b message. If the first transceiver 12 does not require fair frame alignment but the second transceiver 14 does, then the first transceiver 12 requests a timing advance of −(dr). If the first transceiver 12 requires fair frame alignment but the second transceiver 14 does not, then the first transceiver 12 requests a timing advance of (do). If the first transceiver 12 would like to bias the frame alignment in favor of the first transceiver 12, it selects a value between ((do)−(dr))/2 and (do). If the first transceiver 12 would like to bias the frame alignment in favor of the second transceiver 14, it selects a value between −(dr) and ((do)−(dr))/2.

An O-Nsc message field 314, an O-Lce message field 316, and an O-Δf message field 318 indicate a requested number of subchannels, cyclic extension length, and subchannel spacing for the next training iteration, respectively. A downstream PSD message field 314 defines the downstream PSD for the next training iteration from the first transceiver 12.

An O-Lcp message field 322, an O-Lcs message field 324, and an O-β message field 326 indicate the current downstream cyclic prefix length, the cyclic suffix length, and the transmit window length, respectively.

If vector training is used, then the length of time each first transceiver 12 transmits is specified in a $L_{O-P-VECn}$ message field 332 and the length of time each second transceiver 14 transmits is specified in $L_{R-P-VECn}$ message field 334. If vectored training is not used, these values are set to 0.

A preferred embodiment of the O-(N)ACKn 208a message is extended relative to VDSL version 1 to allow for independent acknowledgement of the PSD and modulation parameter change requests. The O-(N)ACKn 208a message contains one byte of information. If the value is 0 (0x00), the first transceiver 12 will switch to the timing advance and PSD parameters specified in the R-Modpsd$_n$ 206b message after five frames and will switch to the modulation parameters requested in the R-Modpsd$_n$ 206b message for the next training iteration. If the value is 15 (0x0F), the first transceiver 12 will switch to the timing advance and PSD parameters specified in the R-Modpsd$_n$ 206b message after five frames and the current modulation parameters will be used for the next training iteration. If the value is 240 (0xF0), the first transceiver 12 will not switch to the timing advance and PSD parameters specified in the R-Modpsd$_n$ 206b message after five frames and will switch to the modulation parameters requested in the R-Modpsd$_n$ 206b message for the next training iteration. If the value is 255 (0xFF), the first transceiver 12 will not switch to the timing advance and PSD parameters specified in the R-Modpsd$_n$ 206b message after five frames and the current modulation parameters will be used for the next training iteration.

In an embodiment, the O-Galf 210a message 210a is transmitted containing the value 129 (0x81). In an embodiment, the O-Synchro 212a message is similar to that known to VDSL version 1.

Turning now to FIG. 5c, a preferred embodiment of the R-Info$_a$ 202b message is depicted. The R-Info$_a$ 202b message is used on the first iteration (n=0) and includes a fair alignment flag message field 350, a (dr) message field 352, and an upstream PSD message field 354. A zero value in the fair alignment flag message field 350 indicates that the second transceiver 14 does not require frame alignment while a one value indicates that frame alignment is required by the second transceiver 14.

The (dr) message field 352 indicates how many samples that the second signal sequence 150b is ahead of the first signal sequence 150a and may be a negative value. The upstream PSD message field 354 defines the upstream PSD for the second signal sequence 150b.

If the first transceiver 12 indicates that fair frame alignment is required in the O-Info 202a message, then the second transceiver 14 estimates the downstream channel delay, (dr), and begins transmitting the R-P-Training$_n$ signal 164b such that the start is (dr) samples ahead of O-P-Training$_n$ signal 164a. If the first transceiver 12 indicates that fair frame alignment is not required in the O-Info 202a message, then the second transceiver 14 can either estimate (dr) and begin transmitting the R-P-Training signal 164b such that the start is (dr) samples ahead of the O-P-Training$_n$ signal 164a, or align the starts of the R-P-Training$_n$ signal 164b and the O-P-Training$_n$ signal 164a and select (dr)=0.

In an embodiment, the R-Info$_b$ 202c message is used by the second transceiver 14 after the first iteration n(n>0) and is substantially the same as the R-Info$_a$ 202b message, except that the R-Info$_b$ 202c message has no message field corresponding to the upstream PSD message field 354. If frame alignment is active, the second transceiver 14 attempts to maintain the appropriate alignment (i.e., (dr)+any timing advance requested in the O-Modpsd$_{n-1}$ 206a message and agreed to in the R-(N)ACKn−1 message, to be discussed hereinafter, scaled by any change to the subchannel spacing), even when either of the line probe state lengths are nonzero (such that a timing reference is not available to the second transceiver 14).

In an embodiment, the R-(N)ACKn 208b message value ACK indicates the second transceiver will switch to the timing advance and PSD parameters specified in the O-Modpsd$_n$ 206a message after five frames while message value NACK indicates that the second transceiver will not switch. If the PSD is modified, then all signal levels that follow the ACK in the R-(N)ACKn 206b message are transmitted at either the modified PSD level or limited to the modified PSD level.

In an embodiment, the R-Idle 204b and the R-Synchro 212b messages are substantially similar to the corresponding signals according to the VDSL version 1 standard.

Turning now to FIG. 5d, a preferred embodiment of the R-Modpsd$_n$ 206b message is depicted. A second iteration flag message field 400 indicates whether or not additional training iterations are required. If the second iteration flag message field 400 contains a zero value, the following message fields are ignored. If the second iteration flag message field 400 contains a one value, further training iterations are requested. The second iteration flag message field 400 provides the mechanism for the second transceiver 14, for example the VTU-R, to negotiate the number of training iterations with the first transceiver 12, for example the VTU-O.

A pilot subchannel message field 402 identifies the subchannel employed for the pilot during echo cancellation signaling. The R-Modpsd$_n$ 206b message also comprises an $L_{R-P-MEDLEYn}$ message field 404, a $L_{R-P-ECn}$ message field 406, a $L_{R-P-PRQBEn+1}$ message field 408, a downstream PSD update message field 410, a R-Nsc message field 412, a R-Lce message field 414, a R-Δf message field 416, an upstream PSD message field 418, a R-Lcp message field 420, a R-Lcs message field 422, and a R-β message field 424. These message fields in the R-Modpsd$_n$ 206b message, with the exceptions noted, have a function substantially similar to that of corresponding message fields in the O-Modpsd$_n$ 206a message. In an embodiment, the R-Galf 210b message contains the value 129 (0×81).

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A communication system, comprising:
a first transceiver operable to communicate according to a digital subscriber line standard; and
a second transceiver operable to communicate according to the digital subscriber line standard with the first transceiver, the first and the second transceivers operable to perform an initialization, including a handshake portion with a plurality of handshake meessages, a channel analysis portion, and a training portion, the first and second transceivers negotiating a plurality of iterations of the training portion, wherein each iteration of the training portion by the first transceiver includes a first signal sequence and a first message sequence the first signal sequence including a plurality of first signals, the first transceiver operable to adjust the length of at least some of the first signals and each iteration of the training portion by the second transceiver includes a second signal sequence and a second message sequence, the second signal sequence including a plurality of second signals, the second transceiver operable to adjust the length of at least some of the second signals and wherein a first handshake message identifies an initial value of a pseudo-random binary sequence, the initial value of the pseudo-random binary sequence being used to generate at least a part of the first signal sequence and the second signal sequence.

2. The communication system of claim 1, wherein the first transceiver and the second transceiver are operable to communicate according to a very high data rate digital subscriber line standard.

3. The communication system of claim 1, wherein the first transceiver and second transceiver cooperate to determine how many iterations of the training portion to perform.

4. The communication system of claim 1, wherein the training portion selects a fair frame alignment mode and identifies a time advance correction.

5. The communication system of claim 1, wherein a message field of the first message sequence identifies a plurality of initial values of a pseudo-random binary sequence, the initial values of the pseudo-random binary sequence being used to generate at least a part of a first vectored training signal of the first signal sequence and at least a part of a second vectored training signal of the second signal sequence.

6. A digital subscriber line transceiver, comprising:
a transmitter section operable to perform an initialization with a remote transceiver, the initialization including a first handshake portion, a first channel analysis portion, and a first training portion, a plurality of iterations of the training portion between the transmitter and remote transceiver used to perform the initialization, wherein the transmitter section further transmits a plurality of first signal sequences to the remote transceiver, each first signal sequence comprised of a plurality of first signals; and a receiver section operable to initialize with the remote transceiver using a second handshake portion, a second channel analysis portion, and a second training portion, a plurality of second training iterations used to perform the initialization between the receiver section and the remote transceiver, wherein the receiver section receives a plurality of second signal sequences from the remote transceiver, each second signal sequence comprised of a plurality of second signals, and further wherein the transmitter section adjusts, after the completion of each first and second signal sequence except, optionally, the last, at least one operating parameter of the transmitter based on the first and second signals, the operating parameters selected from the group consisting of an echo cancellation, a power spectrum density, a timing advance, a number of subchannels, a subchannel spacing, and a cyclic extension length.

7. The digital subscriber line transceiver of claim 6, wherein the first signal sequence is transmitted on a plurality of subchannels, the first training portion is carried by some of the subchannels by modifying the first signal sequence, and the first signal sequence and first training portion are ended when none of the operating parameters is adjusted.

8. The digital subscriber line transceiver of claim 6, further including a hybrid and wherein each first signaling iteration comprises a probe signal suitable for training the hybrid and a quiet interval, a time duration of the probe signal being adjustable.

9. The digital subscriber line transceiver of claim 8, wherein the probe signal occurs first in each first signal sequence.

10. The digital subscriber line transceiver of claim 6, wherein the first training portion defines a vectored communication mode.

11. A method for initializing digital subscriber line communication between transceivers, comprising:

transmitting from a first transceiver a first handshake message, the first handshake message including an initial value for a pseudo-random binary sequence;

receiving a second handshake message;

iteratively communicating a training portion between the first transceiver and a second transceiver;

transmitting a first channel analysis message from the first transceiver to the second transceiver;

iteratively transmitting a first signal sequence, the first signal sequence including a first probe signal suitable for adjusting a hybrid;

iteratively receiving a reflection of the first probe signal;

iteratively adjusting the hybrid based on the reflection of the first probe signal; and iteratively receiving a second signal sequence, the second sequence including a second probe signal.

12. The method of claim 11, wherein the iteratively communicating the training portion further comprises:

transmitting a first training message from the first transceiver to the second transceiver; and transmitting a second training message from the second transceiver to the first transceiver.

13. The method of claim 12, wherein the time duration of the first probe signal is defined in the first training message and the time duration of the second probe signal is defined in the second training message.

14. The method of claim 11, wherein the first probe signal is located in a front portion of the first signal sequence and transmitting the first signal sequence further includes transmitting a first pilot signal transmitted on a downstream subchannel after the first probe signal ends.

15. The method of claim 12, wherein the first training message defines a vectored communication mode.

16. The method of claim 12, further including:

determining a number of iterations to transmit the first training message based in part on the content of the second training message; and transmitting an indication, defined in the first training message, to stop sending the second training messages.

* * * * *